(12) United States Patent
Atkins et al.

(10) Patent No.: US 9,853,906 B2
(45) Date of Patent: Dec. 26, 2017

(54) NETWORK PRIORITIZATION BASED ON NODE-LEVEL ATTRIBUTES

(71) Applicant: Lenovo Enterprise Solutions (Singapore) Pte. Ltd., Singapore (SG)

(72) Inventors: Mark G. Atkins, Arvada, CO (US); Gary D. Cudak, Wake Forest, NC (US); Joseph F. Herman, Raleigh, NC (US); Laura A. Weaver, Chapel Hill, NC (US); William J. Sommerville, Raleigh, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 174 days.

(21) Appl. No.: 14/850,176

(22) Filed: Sep. 10, 2015

(65) Prior Publication Data

US 2017/0078207 A1    Mar. 16, 2017

(51) Int. Cl.
| | |
|---|---|
| *H04L 12/851* | (2013.01) |
| *H04L 12/24* | (2006.01) |
| *H04L 12/721* | (2013.01) |
| *H04L 12/803* | (2013.01) |
| *H04L 12/841* | (2013.01) |

(52) U.S. Cl.
CPC .............. *H04L 47/24* (2013.01); *H04L 41/00* (2013.01); *H04L 45/127* (2013.01); *H04L 47/125* (2013.01); *H04L 47/28* (2013.01)

(58) Field of Classification Search
CPC ....... H04L 47/24; H04L 47/125; H04L 47/28; H04L 41/00
See application file for complete search history.

(56) References Cited

U.S. PATENT DOCUMENTS

| | | | | |
|---|---|---|---|---|
| 9,615,351 B2* | 4/2017 | Zhu | ................. | H04W 68/02 |
| 2009/0232001 A1* | 9/2009 | Gong | ................. | H04L 47/10 370/236 |
| 2009/0285099 A1* | 11/2009 | Kahn | ................. | H04L 47/10 370/236 |
| 2010/0080153 A1* | 4/2010 | Kahn | ................. | H04W 72/1247 370/310 |
| 2013/0322237 A1* | 12/2013 | DeCusatis | ................. | H04L 47/33 370/230 |

* cited by examiner

*Primary Examiner* — Albert T Chou
(74) *Attorney, Agent, or Firm* — Jeffrey L. Streets

(57) ABSTRACT

A first method includes a plurality of nodes communicating with a network switch, each node transmitting a packet with a packet header that includes a value of a node-level attribute selected from a node utilization level, a node role, and a dependency involving the node, and the network switch receiving the packet and prioritizing transmission of the packet based on the value of the node-level attribute identified in the packet header. In a related second method, each node reports the value of the node-level attribute to a management entity, the management entity determines a priority for each node based on the value of the node-level attribute received from each node, and the management entity provides the priority for each node to the network switch, such that the network switch prioritizes, for each packet, transmission of the packet based on the priority for the node involved in communication of the packet.

19 Claims, 5 Drawing Sheets

| Node | Node Utilization Level (%) | Transmission Priority (Rank) |
|---|---|---|
| A | 60 | 4 |
| B | 70 | 3 |
| C | 90 | 1 |
| D | 85 | 2 |

FIG. 4A

| Node | Node Role | Transmission Priority (Rank) |
|---|---|---|
| X | Management | 1 |
| B | Compute | 3 |
| C | Compute | 3 |
| D | Storage | 2 |

FIG. 4B

| Node | Dependencies (Node is Dependent Upon) | Transmission Priority (Rank) |
|---|---|---|
| A | B,C | 3 |
| B | C | 2 |
| C | – | 1 |
| D | C | 3 |

FIG. 4C

| Node-Level Attributes | | | | Scoring | | | | |
|---|---|---|---|---|---|---|---|---|
| Node | Utilization Level (%) | Node Role | Dependencies (Node is Dependent Upon) | Utilization Score | Node Role Score | Dependency Score | Total Score | Transmission Priority (Rank) |
| X | 45 | Mgmt | – | | 80 | | 80 | 3 |
| A | 60 | Compute | B,C | | 40 | –20 | 20 | 5 |
| B | 70 | Compute | C | | 40 | | 40 | 4 |
| C | 90 | Compute | – | 40 | 40 | 30 | 110 | 1 |
| D | 85 | Storage | C | 30 | 70 | –10 | 90 | 2 |

FIG. 4D

NETWORK PRIORITIZATION BASED ON NODE-LEVEL ATTRIBUTES

BACKGROUND

Field of the Invention

The present invention relates to methods of prioritizing network packet transmissions among a plurality of nodes.

Background of the Related Art

Many modern computer system include multiple computers that are interconnected into a network so that the computers can communicate and work together. The network might be as widespread as the Internet or as local as a small business. In either case, a network of computers must be able to communicate efficiently in order to complete tasks in a timely manner.

Compute products, such as servers, are increasingly used in concert with each other in the form of an HPC (high performance compute) cluster configuration, cloud configuration or a data center configuration. Due to the highly integrated nature of these configurations, network packet transmissions can limit the overall performance of the system. Network throughput and latency improvements are needed in order to make the most efficient use of the compute capabilities of these systems.

BRIEF SUMMARY

One embodiment of the present invention a method, comprising a plurality of nodes communicating with a network switch, each node transmitting a packet with a packet header that includes a value of a node-level attribute selected from a node utilization level, a node role, and a dependency involving the node, and the network switch receiving the packet and prioritizing transmission of the packet based on the value of the node-level attribute identified in the packet header.

Another embodiment of the present invention provides a method comprising communicating packets between a plurality of nodes and a network switch, and each node reporting a value of a node-level attribute to a management entity, wherein the node-level attribute is selected from a node utilization level, a node role, and a dependency involving the node. The method further comprises the management entity determining a priority for each node as a function of the value of the node-level attribute received from each node, and the management entity providing the priority for each node to the network switch. Still further, the method comprises the network switch prioritizing, for each packet, transmission of the packet based on the priority for the node involved in communication of the packet.

BRIEF DESCRIPTION OF THE SEVERAL VIEWS OF THE DRAWINGS

FIG. 4A is a table illustrating a determination of transmission priority based on node utilization level.

FIG. 4B is a table illustrating a determination of transmission priority based on node role.

FIG. 4C is a table illustrating a determination of transmission priority based on node dependencies.

FIG. 4D is a table illustrating a determination of transmission priority using a scoring system that factors in node utilization level, node role and node dependencies.

DETAILED DESCRIPTION

Figure 1:
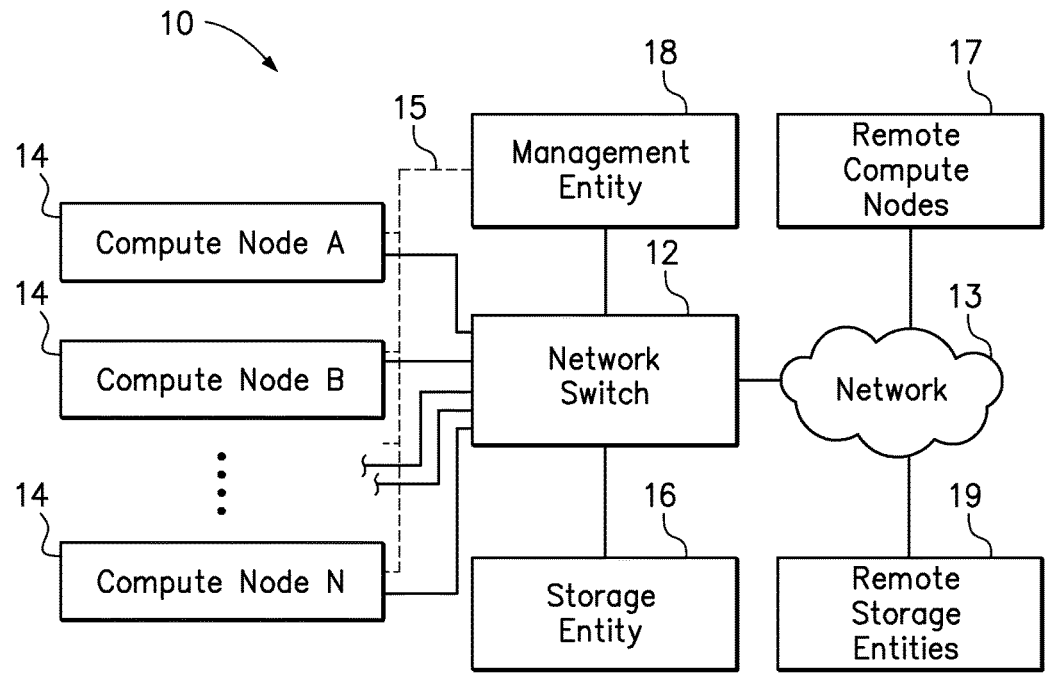
FIG. 1 is a diagram of a computer system in which a network switch communicates packets to and from compute nodes, storage entities and a management entity.

One embodiment of the present invention a method, comprising a plurality of nodes communicating with a network switch, each node transmitting a packet with a packet header that includes a value of a node-level attribute selected from a node utilization level, a node role, and a dependency involving the node, and the network switch receiving the packet and prioritizing transmission of the packet based on the value of the node-level attribute identified in the packet header.

The node-level attribute or node-specific condition may take several forms. In one non-limiting example, the node-level attribute is a node utilization level selected from a current node utilization level and a measure of node utilization over a period of time. In another non-limiting example, the node-level attribute is a node role selected from management node, compute node, and storage node. In a further non-limiting example, the node-level attribute is a dependency involving the node, wherein the dependency is selected from identifying a node upon which the node is currently dependent for a transmission, identifying a node that current depends upon the node for a transmission, identifying a number of nodes upon which the node currently depends for a transmission, and identifying a number of nodes that current depend upon the node for a transmission. These and other node-level attributes are within the scope of the present invention. For example, the packet may include a workload, and the packet header may further include a value of a workload priority for the workload. The value of the node-level attribute may be encapsulated in the packet header by either a network adapter driver running on the node or workload software running on the node.

In one implementation, the network switch may receive a packet from each node and use the value of the node-level attribute in the packet received from each node to determine a relative priority or rank among the plurality of nodes. It is anticipated that the relative priority among the plurality of nodes may change over time with changes in the node-level attribute of one or more of the nodes. Accordingly, the method will give the highest priority to the transmission of packets that are most needed at any given point in time. Optionally, the method may further comprise the network switch receiving a user selection of a priority mode for prioritizing transmission of packets, wherein the priority mode is selected from utilization mode, role mode, dependency mode, and workload mode. The network switch may, after receiving a selection of a priority mode, determine the relative priority of each node by the relative magnitude of each node's node-level attribute value associated with the selected priority mode. For example, in a utilization mode, the relative priority of each may be determined by the relative magnitude of each node's utilization level.

Furthermore, the relative priority of each node among the plurality of nodes may be determined as a function of multiple node-level attributes, such as determining relative priority as a function of utilization, dependency, and role. In such an embodiment, the relative priority of each node among the plurality of nodes may be determined by a relative point total, wherein a point total for each node is a cumulative sum of a utilization score, a dependency score, and a role score.

In another implementation of the method, the network switch may store, for each of the plurality of nodes, a value of the most-recently received node-level attribute received in the packet header a packet. Each node may periodically transmit a new packet with a packet header having an updated value for the node-level attribute. The current or updated value will be used in determining priority until the node-level attribute value is next updated or becomes invalid. In one option, the value is updated by each node selecting a packet having less than a predetermined amount of data and including the updated value for the node-level attribute in a packet header of the selected packet. By selecting a packet with a small size, the packet may be transmitted and received quickly, thus reducing latency in implementing the updated value in a priority determination. In a further option, a new packet with the packet header having the updated value for the node-level attribute may be transmitted in response to a change in the value of the node-level attribute greater than a predetermined change. Still further, the packet header may further include a time period over which the value of the node-level attribute is valid, such that a stale value is not continued to be used in priority determinations. If a node should shut down, having a time period over which the value is valid will prevent that node from continuing to receive priority.

Another embodiment of the present invention provides a method comprising communicating packets between a plurality of nodes and a network switch, and each node reporting a value of a node-level attribute to a management entity, wherein the node-level attribute is selected from a node utilization level, a node role, and a dependency involving the node. The method further comprises the management entity determining a priority for each node as a function of the value of the node-level attribute received from each node, and the management entity providing the priority for each node to the network switch. Still further, the method comprises the network switch prioritizing, for each packet, transmission of the packet based on the priority for the node involved in communication of the packet.

The foregoing method may further include each node periodically updating the value of the node-level attribute to the management entity, and the management entity determining a priority for each node as a function of the updated value of the node-level attribute received from each node. Optionally, the management entity may receive a user selection of a priority mode for prioritizing transmission of packets, wherein the priority mode is selected from utilization mode, role mode, and dependency mode. The management entity may, therefore, determine the relative priority of each node by the relative magnitude of the node-level attribute value associated with the selected priority mode.

Yet other embodiments of the present invention provide computer program products comprising program instructions embodied on a non-transitory computer readable storage medium, where the program instructions are executable by a processor to cause the processor to perform one of the foregoing methods or any one or more aspects of the methods described herein. A separate description of the methods will not be duplicated in the context of a computer program product.

FIG. 1 is a diagram of a computer system 10 in which a network switch 12 communicates packets to and from compute nodes 14, a storage entity 16 and a management entity 18. Any number of computer nodes 14 (i.e., Compute Node A to Compute Node N) may participate in the methods of the present invention. Furthermore, the network switch 12 may communicate packets to and from remote compute nodes 17 and remote storage entities 19 via the network 13, which may include additional network switches. While the management node 18 is shown in communication with the compute nodes 14 through the network switch 12, it is also possible that the management node 18 may be in communication with the compute nodes 14 through a direct connection 15 (see dashed lines). In accordance with various embodiments of the present invention, the network switch 12 receives packets from source nodes and transmits each of the packets to a destination node identified in a packet header within the packet.

Figure 2:
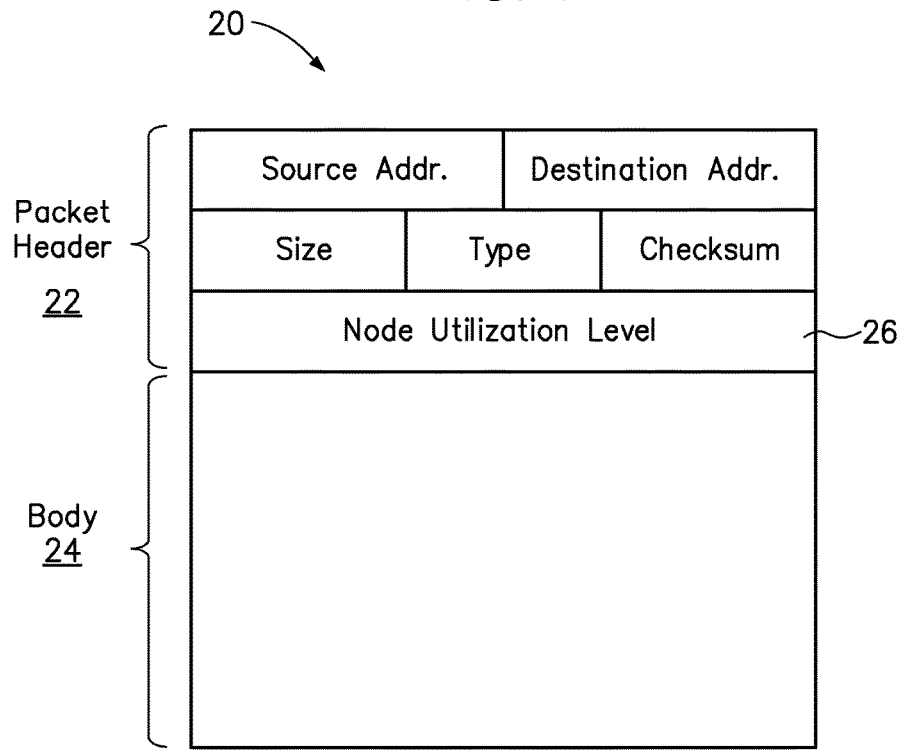
FIG. 2 is a diagram of a packet having a packet header that includes a value of a node-level attribute.

FIG. 2 is a diagram of a packet 20 including a packet header 22 and a body 24. The packet header 22 in this non-limiting example includes a source address, a destination address, a packet size, a packet type, and a checksum. This and other data about the packet may be included in the packet header 22. In accordance with one embodiment of the present invention, the packet header 22 also includes a value of a node-level attribute, such as the node utilization level 26. Other fields may be included in the packet header to provide additional node-level attributes, such as a node role, node dependencies, or an indication of how long the data is valid (e.g. a node utilization duration may limit use of a node utilization value to a period of 8 seconds following receipt, after which the value is no longer valid).

Figure 3:
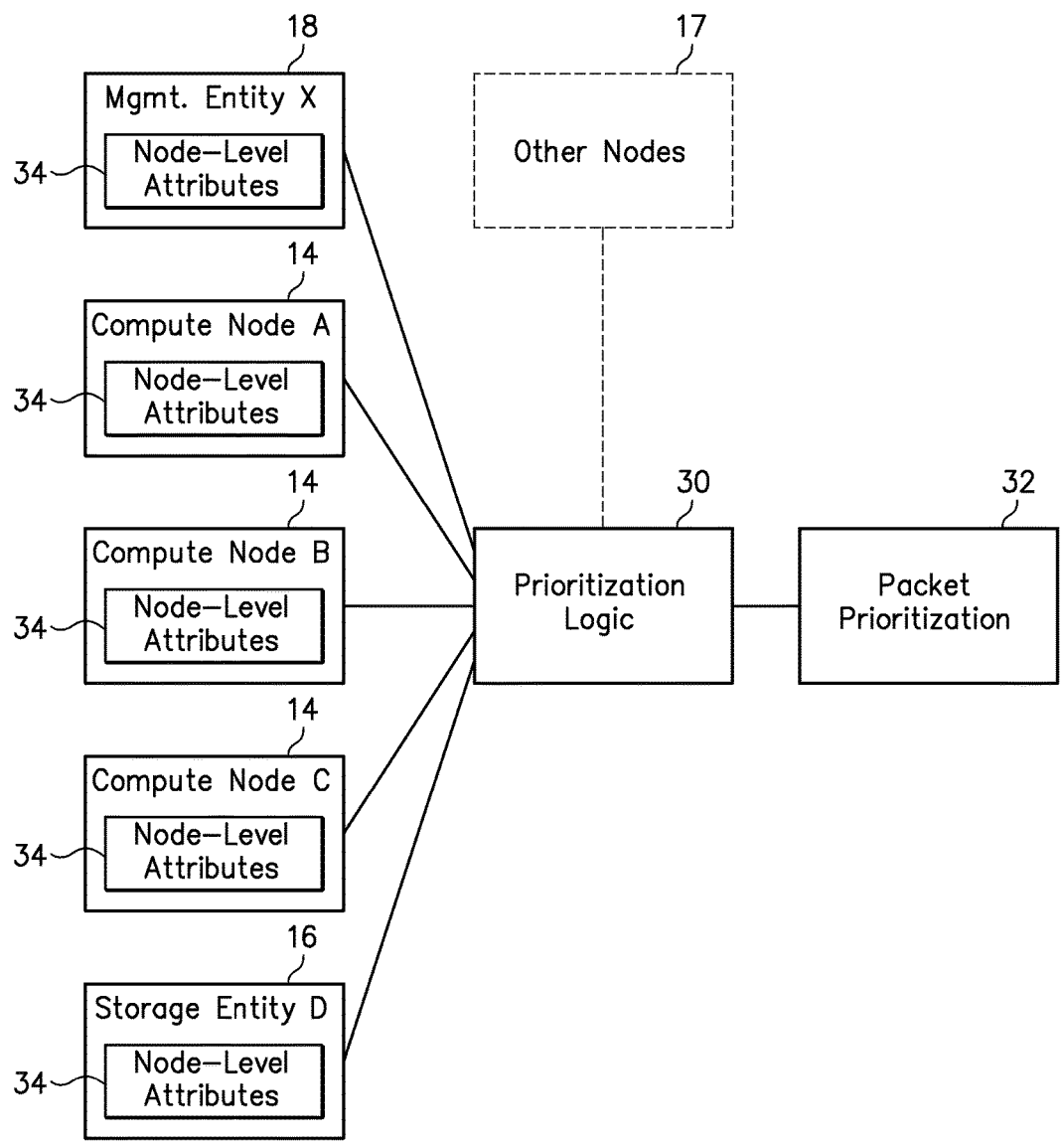
FIG. 3 is a diagram of a plurality of nodes communicating node-level attribute values to a prioritization logic module for determining packet prioritization.

FIG. 3 is a diagram of a plurality of nodes 14, 16, 18 communicating node-level attribute values to a prioritization logic module 30 for determining packet prioritization 32. In a first "peer-to-peer" embodiment, the prioritization logic 30 is performed by the network switch using the node-level attribute data 34 that is obtained from each node in a packet header. In a second "management centric" embodiment, the prioritization logic 30 is performed by a management entity, such as management entity 18 of FIG. 1 (shown also as Management Entity X in FIG. 3). The management entity 18 then provides priorities to the network switch (see network switch 12 in FIG. 1). In either the first "peer-to-peer" embodiment or the second "management centric" embodiment, the network switch may perform the function of packet prioritization 32 using the output of the prioritization logic 30.

It should be appreciated that embodiments of the present invention do not require that all nodes provide node-level attributes for use in determining priorities. For example, if Compute Node A (14) transmits a packet to an identified one of the other nodes 17 for which there is no utilization data, but Compute Node A indicates a dependency upon that identified other node 17, then the network switch should prioritize any reply to Compute Node A from that identified other node 17. In another example, if one of the other nodes 17 transmits a packet to the Management Entity X (18), if the network switch has a record that the Management Entity X is in the role of a management node, then the communication to the Management Entity X may be prioritized regardless of receiving any node-level attributes from the other node 17.

FIG. 4A is a table illustrating a determination of transmission priority based on node utilization level. This determination, as well as the determinations in FIGS. 4B, 4C, and 4D, may be made by the network switch in a peer-to-peer embodiment or by a management entity in a management-centric embodiment. In either embodiment, the determination may be made as illustrated. As shown, the node with highest percentage utilization level is Node C with a node utilization level of 90%. Accordingly, Node C is given the highest priority, where priority is a rank in ascending order (highest priority is a 1, and successive priorities are indicated by successively higher numbers).

FIG. 4B is a table illustrating a determination of transmission priority based on node role. This determine uses a predetermined association between node role and priority. In the present example, a node with a management role is given the highest priority (a "1"), a node with a data storage role is given the second highest priority (a "2"), and the nodes with a compute role are given the lowest priority (a "3").

FIG. 4C is a table illustrating a determination of transmission priority based on node dependencies. Node dependencies are an indication of reliance upon the output of another node. Where a first node requires completed transmissions from a second node in order to continue a process, the first node is said to be "dependent" upon the second node. Where the first node provides a transmission that is necessary for a second node to continue a process, the first node may be said to be a "provider." It should be recognized that any given node may be both "dependent" upon one node and a "provider" to another node. Embodiments that consider node dependencies may give higher priority to transmissions from nodes that are "providers" since those transmissions enable the "dependent" nodes to continue a process. As shown in the table, Node C is given the highest transmission priority because there are three nodes (Nodes A, B and D) that each depend upon transmissions from Node C. Transmissions from Node B are given second priority since one node (Node A) is dependent upon Node B. Nodes A and D are given a lower priority since there are no other nodes that are dependent upon transmissions from those nodes.

FIG. 4D is a table illustrating a determination of transmission priority using a scoring system that factors in node utilization level, node role and node dependencies. In this illustration, node-level attributes are assumed from each of five nodes, including Nodes X, A, B, C and D shown in FIG. 3. The node-level attributes are consistent with the descriptions provided in reference to FIGS. 4A-4C. The table further includes a "Scoring" section, where each of the node-level attributes produces a score that contributes to a total score for each node. The total score for each node is the basis for determining a transmission priority for each node. The exact scoring formulas and weightings are only presented for the purpose of illustration and should not be taken to limit the scope of the present invention.

In this non-limiting illustration, a utilization score is calculated as 2 points for every percent of utilization greater than 70 percent utilization, with no penalty for have less than 70 percent utilization. For example, Node C has a utilization score of 40 because its 90% utilization is 20 percentage points greater than the 70 percent threshold, and the 20 percentage points is multiplied by 2 points per percent to result in a utilization score of 40 points.

In this non-limiting illustration, a node role score is assigned on the basis of a predetermined point system. Nodes with a management role are given a node role score of 80, nodes with a data storage role are given a node role score of 70, and nodes with a compute role are given a node role score of 40.

In this non-limiting illustration, a dependency score for a given node is calculated by adding 10 points for every other node that depends upon packet transmissions from the given node and subtracting 10 points for every other node that the given node is dependent upon for packet transmissions. For example, Node C has a dependency score of 30 since Nodes A, B and D depend upon Node C for packet transmissions. Conversely, Node A has a dependency score of −20 since it depends upon packet transmissions from both Nodes B and C without any nodes depending upon Node A.

As a result of the scoring, Node C is given the highest priority since it has the highest total score of 110. Each of the other nodes are then ranked as shown. However, if relative priorities are desired, the total scores themselves may be used.

Other node-level attributes and other combinations of node-level attributes may also be considered in a scoring system. For example, each packet may identify a workload (identification) associated with the transmission, such that packets identifying a workload may be scored based, in part, on the priority of the workload. It should be recognized that the "table" format is provided for purposes of illustration, and that the invention is not limited to any particular data structure or illustration format.

Figure 5:
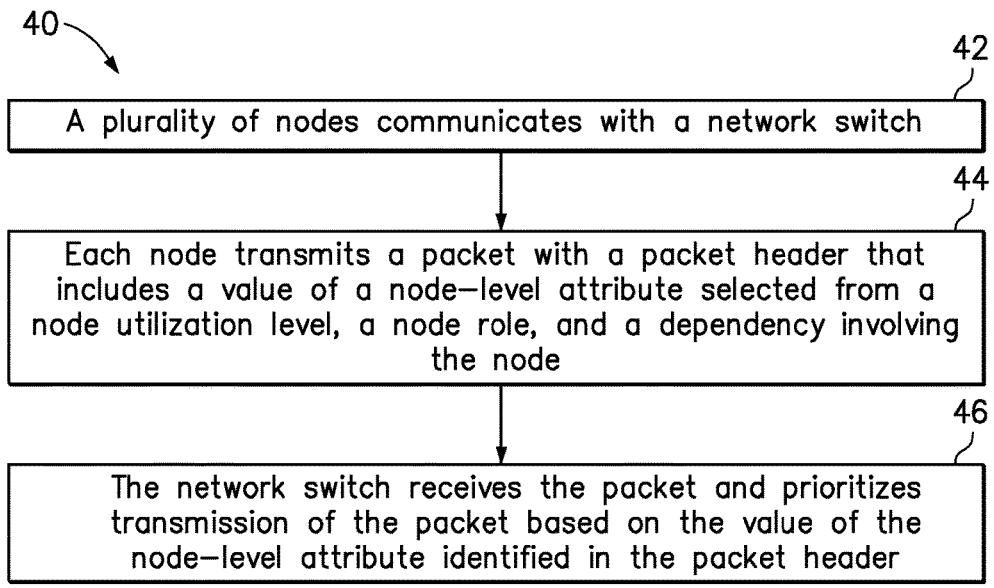
FIG. 5 is a flowchart of a first "peer-to-peer" method of prioritizing network packet transmissions.

FIG. 5 is a flowchart of a first "peer-to-peer" method 40 of prioritizing network packet transmissions. In step 42, a plurality of nodes communicate with a network switch. In step 44, each node transmits a packet with a packet header that includes a value of a node-level attribute selected from a node utilization level, a node role, and a dependency involving the node. In step 46, the network switch receives the packet and prioritizes transmission of the packet based on the value of the node-level attribute identified in the packet header.

Figure 6:
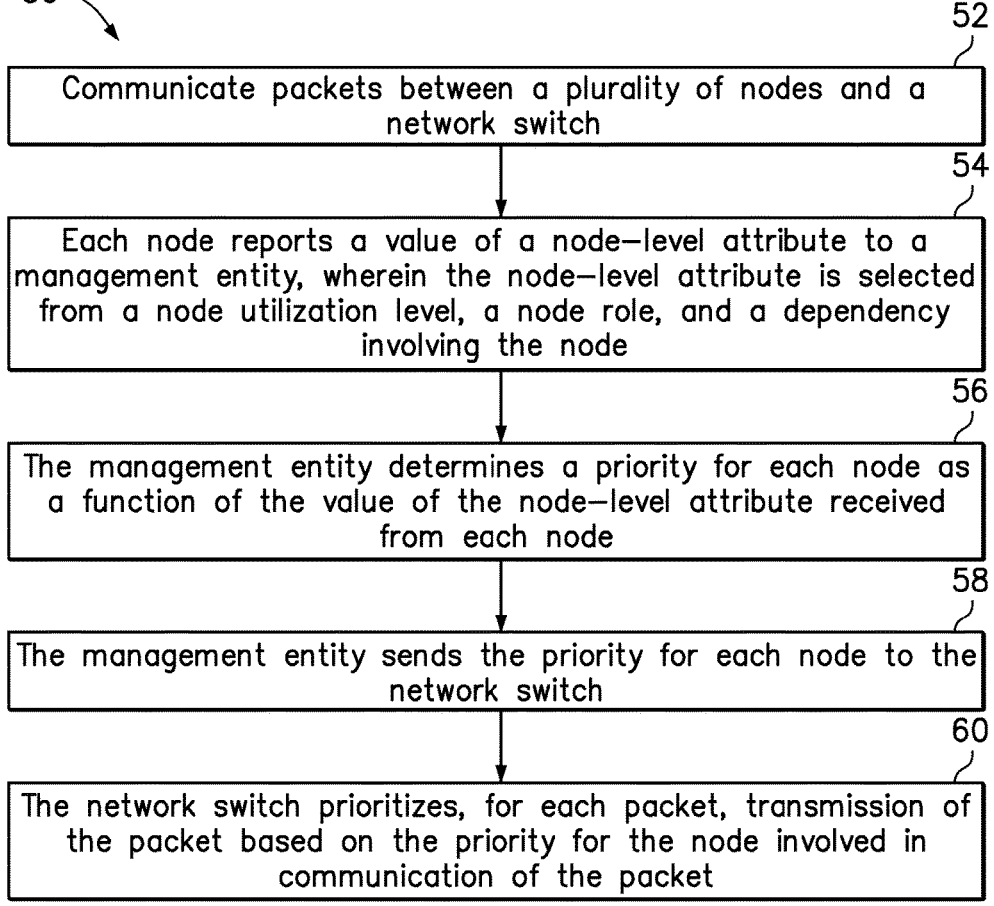
FIG. 6 is a flowchart of a second "management-centric" method of prioritizing network packet transmissions.

FIG. 6 is a flowchart of a second "management-centric" method 50 of prioritizing network packet transmissions. In step 52, packets are communicated between a plurality of nodes and a network switch. In step 54, each node reports a value of a node-level attribute to a management entity, wherein the node-level attribute is selected from a node utilization level, a node role, and a dependency involving the node. In step 56, the management entity determines a priority for each node as a function of the value of the node-level attribute received from each node, and, in step 58, the management entity sends the priority for each node to the network switch. Then, in step 60, the network switch prioritizes, for each packet, transmission of the packet based on the priority for the node involved in communication of the packet. Typically, the transmission priority will be based upon the priority of the node designated as the destination in the packet header.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, and/or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, components and/or groups, but do not preclude the presence or addition of one or more other features, integers, steps, operations, elements, components, and/or groups thereof. The terms "preferably," "preferred," "prefer," "optionally," "may," and similar terms are used to indicate that an item, condition or step being referred to is an optional (not required) feature of the invention.

The corresponding structures, materials, acts, and equivalents of all means or steps plus function elements in the claims below are intended to include any structure, material, or act for performing the function in combination with other claimed elements as specifically claimed. The description of the present invention has been presented for purposes of illustration and description, but it is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
a network switch receiving, from each node of a plurality of nodes, a packet with a packet header that includes a value of a node-level attribute selected from the group consisting of a node utilization level, a node role, and a dependency involving the node;

the network switch using the value of the node-level attribute in the packet received from each node to determine a relative priority among the plurality of nodes; and the network switch prioritizing transmission of each of the received packets based on the relative priority of the node from which the packet is received.

2. The method of claim 1, wherein the node-level attribute is a node utilization level selected from a current node utilization level and a measure of node utilization over a period of time.

3. The method of claim 1, wherein the node-level attribute is a node role selected from management node, compute node, and storage node.

4. The method of claim 1, wherein the node-level attribute is a dependency involving the node, wherein the dependency is selected from identifying a node upon which the node is currently dependent for a transmission, identifying a node that current depends upon the node for a transmission, identifying a number of nodes upon which the node currently depends for a transmission, and identifying a number of nodes that current depend upon the node for a transmission.

5. The method of claim 1, wherein the value of the node-level attribute is encapsulated in the packet header by a network adapter driver running on the node, by workload software running on the node, or by fabric software.

6. The method of claim 1, further comprising:
the network switch receiving a user selection of a priority mode for prioritizing transmission of packets, wherein the priority mode is selected from utilization mode, role mode, dependency mode, and workload mode.

7. The method of claim 6, wherein the network switch determines the relative priority of each node by the relative magnitude of the node-level attribute value associated with the selected priority mode.

8. The method of claim 1, wherein the relative priority of each node among the plurality of nodes is determined as a function of utilization, dependency, and role.

9. The method of claim 1, further comprising:
the network switch storing, for each of the plurality of nodes, a value of the most-recently received node-level attribute received in the packet header a packet; and
the network switch periodically receiving, from each node of the plurality of nodes, a new packet with a packet header having an updated value for the node-level attribute.

10. The method of claim 9, wherein the new packet has less than a predetermined amount of data.

11. The method of claim 9, wherein the new packet with the packet header having the updated value for the node-level attribute is transmitted in response to a change in the value of the node-level attribute greater than a predetermined change.

12. The method of claim 1, wherein the packet header further includes a time period over which the value of the node-level attribute is valid.

13. The method of claim 1, wherein the packet includes a workload, and wherein the packet header further includes a value of a workload priority for the workload.

14. A method, comprising:
a network switch receiving, from each node of a plurality of nodes, a packet with a packet header that includes a value of a node-level attribute selected from the group consisting of a node utilization level, a node role, and a dependency involving the node;

the network switch using the value of the node-level attribute in the packet received from each node to determine a relative priority among the plurality of nodes, wherein the relative priority of each node among the plurality of nodes is determined by a relative point total, wherein a point total for each node is a cumulative sum of a utilization score, a dependency score, and a role score; and the network switch prioritizing transmission of each of the received packets based on the relative priority of the node from which the packet is received.

15. A method, comprising:
a management entity receiving, from each node of a plurality of nodes,
a value of a node-level attribute selected from a node utilization level, a node role, and a dependency involving the node;
the management entity determining a priority for each node as a function of the value of the node-level attribute received from each node;
the management entity sending the priority for each node to a network switch; and
the management entity instructing the network switch to prioritize transmission of each packet received by the network switch from the plurality of nodes based on the priority for the node from which the packet is received.

16. The method of claim 15, further comprising:
the management entity periodically receiving, from each node of the plurality of nodes, and updated value of the node-level attribute; and
the management entity determining a priority for each node as a function of the updated value of the node-level attribute received from each node.

17. The method of claim 15, further comprising:
the management entity receiving a user selection of a priority mode for prioritizing transmission of packets, wherein the priority mode is selected from utilization mode, role mode, and dependency mode.

18. The method of claim 17, wherein the management entity determines the relative priority of each node by the relative magnitude of the node-level attribute value associated with the selected priority mode.

19. The method of claim 15, wherein the node-level attribute is a node role selected from management node, compute node, and storage node.

* * * * *